United States Patent [19]
Kato

[11] Patent Number: 6,051,789
[45] Date of Patent: Apr. 18, 2000

[54] CORRUGATED TUBE AND WIRE HARNESS HAVING THE TUBE AS A COVER

[75] Inventor: Takahiro Kato, Yokkaichi, Japan

[73] Assignee: Sumitomo Wiring Systems, Ltd., Mie, Japan

[21] Appl. No.: 09/034,210

[22] Filed: Mar. 4, 1998

[30] Foreign Application Priority Data

Mar. 14, 1997 [JP] Japan ................... 9-061574

[51] Int. Cl.[7] ................ H02G 3/04; H01B 3/00; F16L 11/11
[52] U.S. Cl. ............... 174/68.3; 174/69; 174/72 A; 138/121; 138/128
[58] Field of Search ............. 174/68.3, 69, 70 R, 174/72 R, 72 C; 138/121, 122, 128, 156, 157

[56] References Cited

U.S. PATENT DOCUMENTS

| | | | |
|---|---|---|---|
| 3,892,912 | 7/1975 | Hauck | 174/68.3 |
| 4,229,615 | 10/1980 | Orr, Jr. et al. | 174/117 M |
| 4,970,351 | 11/1990 | Kirlin | 174/68.3 |
| 5,330,699 | 7/1994 | Shetler et al. | 264/508 |
| 5,918,365 | 7/1999 | Uchida et al. | 29/868 |
| 5,965,951 | 10/1999 | Moore et al. | 307/10.1 |

FOREIGN PATENT DOCUMENTS

| | | |
|---|---|---|
| 5-332479 | 12/1993 | Japan . |
| 8-331728 | 12/1996 | Japan . |

*Primary Examiner*—Kristine Kincaid
*Assistant Examiner*—Mark Olds
*Attorney, Agent, or Firm*—Oliff & Berridge, PLC

[57] ABSTRACT

In an automotive vehicle, a wire harness includes a wire bundle which is housed in and protected by a corrugated tube. The tube has two end regions circular in cross-section and a central region elliptical or race-track shaped in cross-section. Between the end regions and central region are transition regions of varying cross-sectional shape. When installed in a vehicle, the central region of the wire harness tube is installed along the vehicle floor such that the projection perpendicular to the floor by the central region of the tube is reduced. This results in the wire harness requiring less space in the vehicle. The tube includes a resilient expansion slit which allows a wire bundle to be inserted in or removed from the tube.

11 Claims, 5 Drawing Sheets

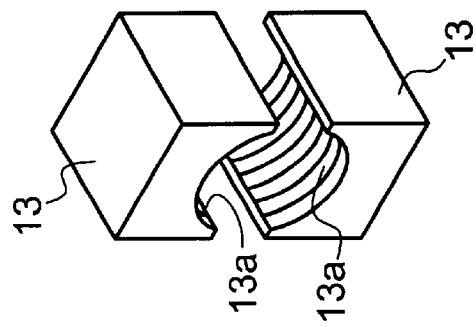
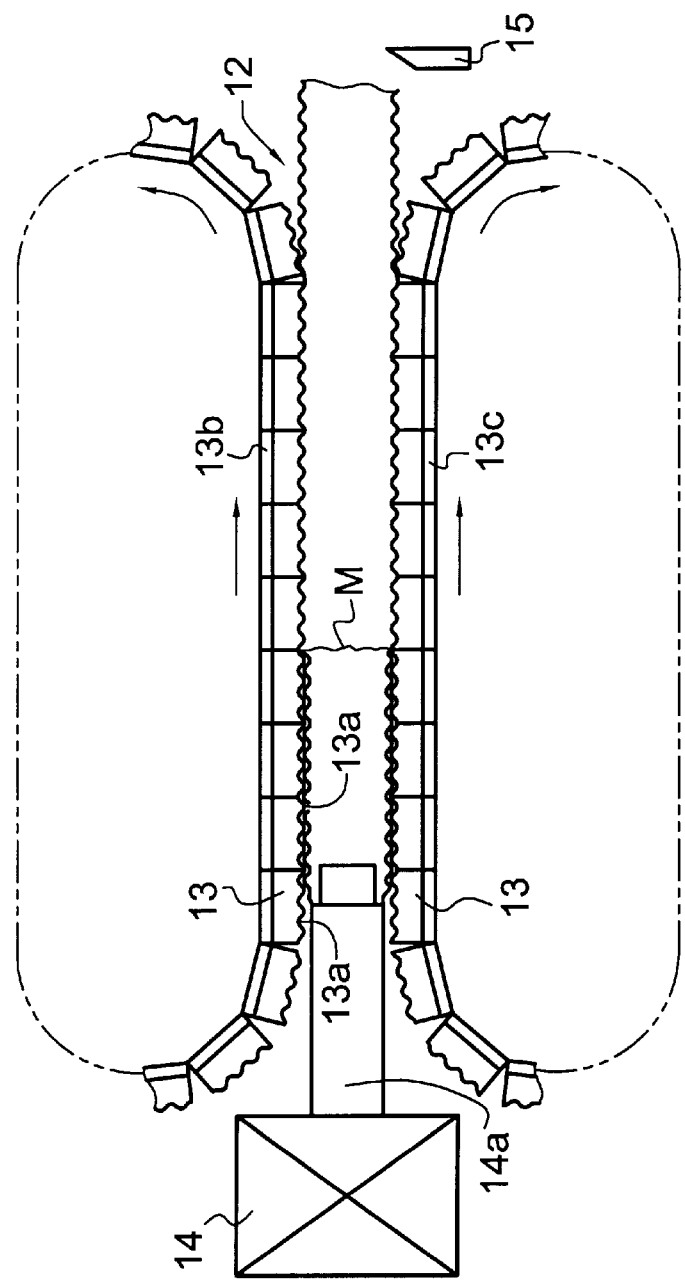

CORRUGATED TUBE AND WIRE HARNESS HAVING THE TUBE AS A COVER

BACKGROUND OF THE INVENTION

1. Field of Invention

The present invention relates to a corrugated tube for use as a cover of a wire harness and to a wire harness having such a tube as a cover. The invention is especially applicable to wire harnesses for use in automotive vehicles, e.g. automobiles.

2. Description of Related Art

As shown in FIG. 7 of the accompanying drawings, in order to prevent a bundle (W) of electric wires constituting a wire harness which is installed between connectors C in the interior of a vehicle from being damaged by interference of the bundle (W) of the electric wires with component parts of the vehicle body positioned in proximity thereto, a cylindrical corrugated tube 1 made of synthetic resin and having corrugations formed by annular concave and convex surfaces formed on its periphery alternately in the lengthwise direction is installed on selected portions of the bundle (W) of the electric wires.

JP-A-8-331728 discloses a tube to protect a vehicle wire harness at a hinge region of a vehicle body. The tube has a cross-section of race-track shape and is corrugated only at a central portion which is to flex.

Although the corrugated tube on the wire harness has a damage-preventing function, it is necessary to distribute the tube in the space in the interior of the vehicle in correspondence to the shape of the wire harness and install it invisibly. Further, there is a demand that the wire harness is installed in the smallest possible space to leave free as much useful space as possible in the interior of the vehicle. Therefore, it is difficult for the conventional cylindrical corrugated tube of FIG. 7 to satisfy the requirements.

SUMMARY OF THE INVENTION

It is an object of the present invention to provide a corrugated tube for covering a wire harness in a vehicle and that minimizes or reduces the wiring space required in the vehicle.

According to a first aspect of the invention there is provided a corrugated tube for use as a wire harness cover, having circumferentially extending corrugations along the entire length of the tube, and along its length at least two first regions having a circular cross-section and between said two first regions a second region. The second region has a first cross-sectional dimension greater than the diameter of the cross-sections of the first regions and a second cross-sectional dimension smaller than the diameter of the cross-sections of the first regions.

In a preferred embodiment the corrugated tube includes transitional regions of varying cross-sectional shape connecting the second region to the first regions.

Preferably, the second region of the tube has a cross-sectional shape that is elliptical or racetrack shaped. The second region of the tube is thereby flattened relative to the first regions.

The term "circumferentially extending corrugations" is intended to include corrugations which lie in a radial plane of the tube, corrugations which lie at an angle to the radial plane and corrugations which are helical.

The cylindrical first regions of the corrugated tube are positioned adjacent to connectors at the ends of the wire harness. This feature allows electrical wires of the harness to be uniformly distributed therein and prevents them from being twisted when the electrical wires are inserted into cavities of the connectors. The relatively flat second region of the corrugated tube, positioned e.g. at the central part thereof, can be installed on the floor of the interior of a vehicle with little or no space between the tube and the floor, thus allowing the space required for the wire harness in the interior of the vehicle to be small. Further, when a flat second region of the corrugated tube is installed in the periphery of a hinge of a lid-panel of the trunk (boot) of the vehicle, the flat region bends easily with the opening and closing of the cover of the trunk and can be laid along the hinge, with the flat region projecting perpendicular to the hinge (or vehicle floor) by a small amount.

Preferably the corrugated tube is made of a synthetic resin. More preferably, the first and second regions of the tube are in one-piece. In a preferred embodiment, the corrugated tube has a longitudinally extending expansion slit.

According to a second aspect of the invention there is provided a wire harness including a bundle of wires and a tube as described above covering the wires. Preferably, the tube has, at its two opposite ends, respective regions of circular cross-sections.

According to a third aspect of the invention there is provided a vehicle having installed in it a wire harness as described above. Preferably, the second region of the corrugated tube lies on a floor panel of the vehicle.

According to a fourth aspect of the invention there is provided a method of making the corrugated tube described above, the method including blow molding an extruded thermoplastic resin into a molding space formed by continuously advancing die segments, the die segments including first segments having circular molding cross-section and second segments having a molding cross-section having a first cross-sectional dimension greater than the diameter of the molding cross-sections of said first segment and a second cross-sectional dimension smaller than the diameter of the molding cross-sections of said first segments.

In a preferred embodiment each die segment includes opposed mold parts which when brought into contact with each other form a die segment and when spaced apart from each other release the molded tube.

BRIEF DESCRIPTION OF THE DRAWINGS

Embodiments of the present invention will now be described for illustration and by way of non-limitative example with reference to the accompanying drawings throughout which like parts are designated by like reference numerals, and in which:

FIG. 5A is a diagrammatic view showing a process of manufacturing of a corrugated tube of the present invention;

FIG. 5B is a perspective view showing a molding die used in the process of FIG. 5A;

DETAILED DESCRIPTION OF PREFERRED EMBODIMENTS

Figure 1:
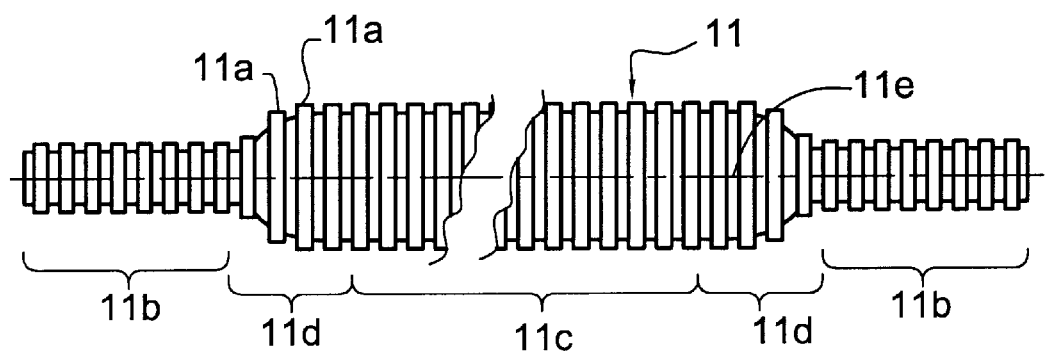
FIG. 1 is plan view showing a corrugated wire harness covering tube which is a first embodiment of the present invention.

FIG. 1 shows a corrugated tube 11 of the invention which is to be used to cover a wire harness. The corrugated tube 11 is made of moldable thermoplastic synthetic resin such as polypropylene, nylon or the like and has circumferentially extending corrugations constituted by ribs or ridges 11a separated lengthwise by circumferentially extending recesses along its whole length. The corrugated tube 11 comprises cylindrical first regions lib circular in cross-section, similar to the conventional corrugated tube of FIG. 7 and positioned at both ends of the tube and a second region 11c relatively flat in section, positioned at the center part of the tube. Transition regions lid of cross-sectional shape which is gradually varying lengthwise, connect the flat region 11c and the cylindrical regions 11b.

Figure 3A:
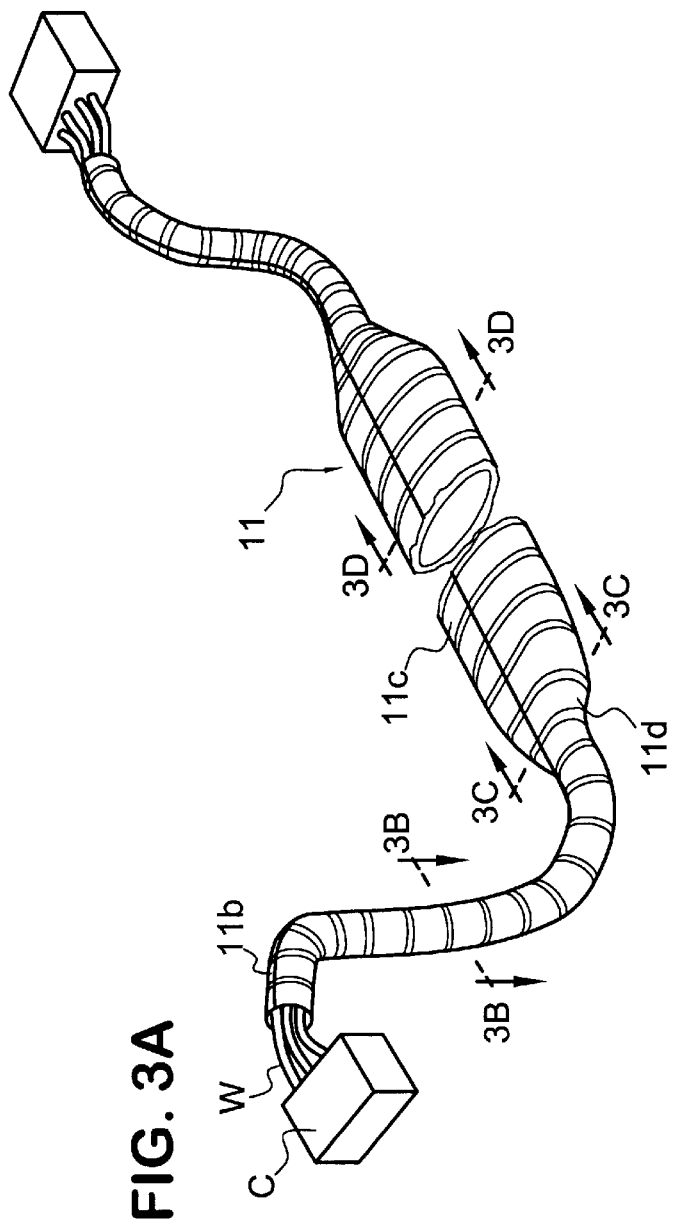
FIG. 3A is a perspective view showing the corrugated tube of FIG. 1 embodying the present invention installed around a wire harness.
Figure 4:
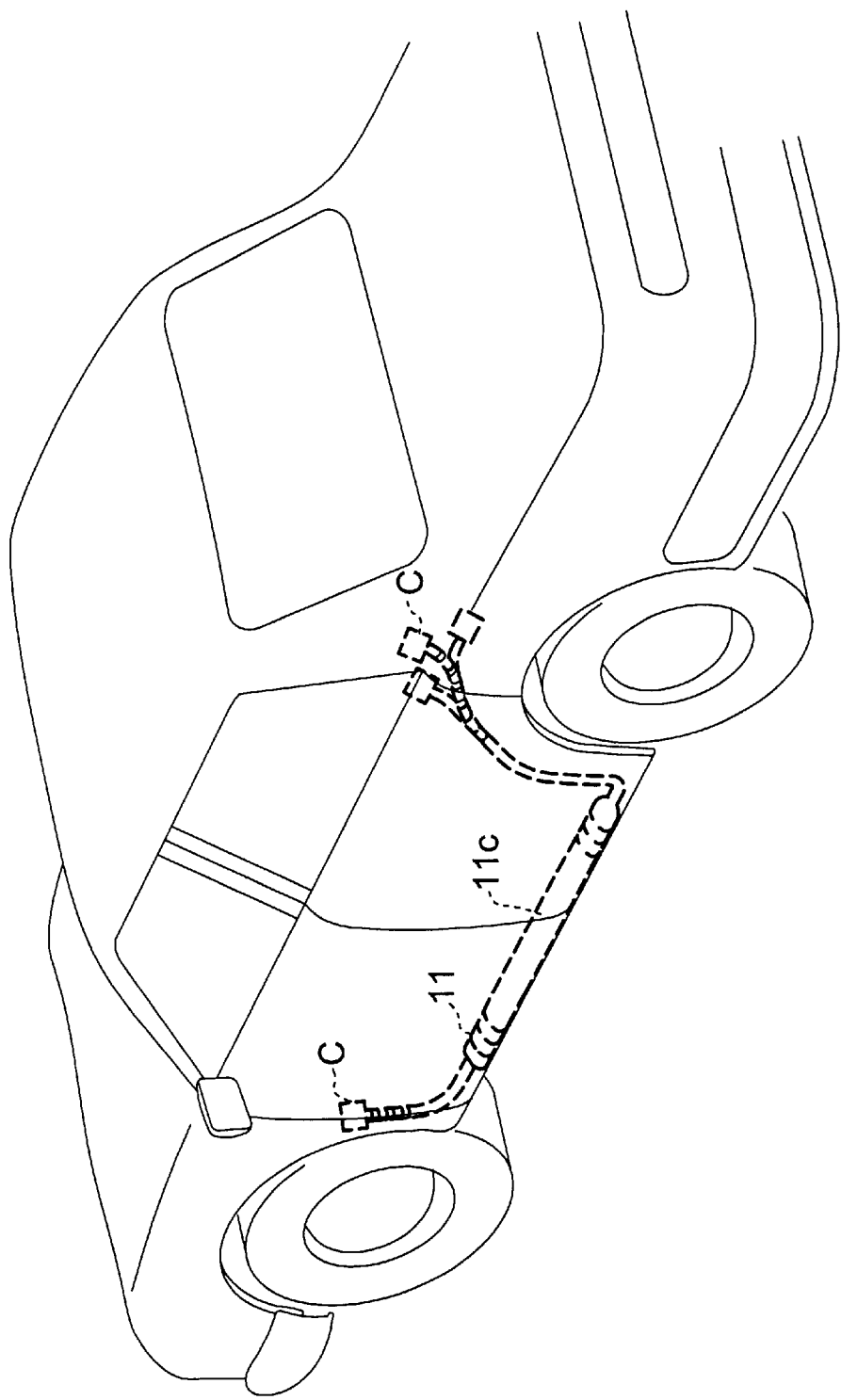
FIG. 4 is a perspective view showing diagrammatically a corrugated tube of the invention mounted on a wire harness installed on the floor of a vehicle.

As shown in FIG. 3A, from the cylindrical region 11b, ends of electric wires (W) of a wire harness covered by the corrugated tube 11 extend to connectors (C). As shown in FIG. 4, when the wire harness is installed in the interior of a vehicle, the flat region 11c is installed along the floor on the floor panel, with its larger cross-sectional dimension either parallel to or perpendicular to the floor panel, depending on the most convenient arrangement for space saving.

Figure 2:
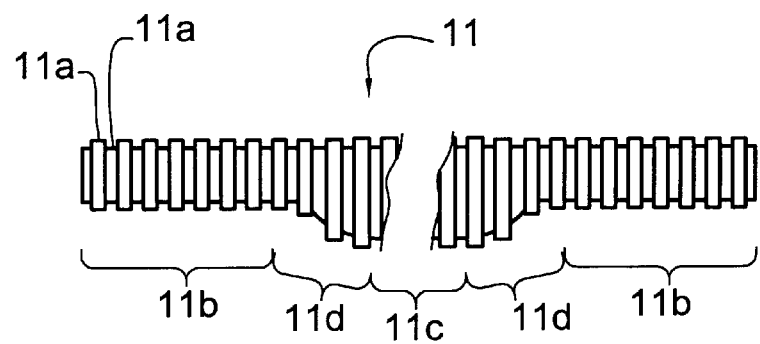
FIG. 2 is a plan view showing a corrugated tube which is another embodiment of the present invention.

As shown in FIG. 2, the flat region 11c may be eccentric from the axis of the cylindrical regions 11b of the corrugated tube 11, depending on the space in which the wire harness is to be installed. The sectional shape of the flat region 11C may be elliptical, race-track, quadrilateral, rectangular or the like according to the space in which the wire harness is installed. By racetrack shaped is meant a shape having flat sides joined by curved end sections. Although FIG. 1 shows a resilient expansion slit lie formed on the corrugated tube 1 in the axial direction thereof, it is not essential to form the expansion slit lie thereon. The expansion slit lie allows the wire bundle (W) to be easily inserted in or removed from the corrugated tube, e.g. when the corrugated tube is installed in a vehicle.

FIGS. 5A and 5B schematically show a method of manufacturing the corrugated tube 11 having the above-described construction as a one-piece body by means of blow molding. A blow molding apparatus 12 comprises a plurality of pairs of block-shaped upper and lower molding die parts 13 each having a molding surface 13a formed on the inner surface thereof in correspondence to the shape of the ribs and recesses of the tube 11. When the upper and lower molding die parts 13 are arranged parallel, they contact each other closely. The upper and lower molding die parts form endless upper and lower die trains 13b and 13c each consisting of for example 80 to 150 molding die parts 13, thus forming the ribs 11a and recesses on the periphery of the corrugated tube.

The upper and lower die trains 13b and 13c are positioned along the axis of a nozzle 14a of an extruder 14 which extrudes a melted synthetic resinous material (M) cylindrically. This material extruded from the extruder 14 is supplied to the molding surfaces 13a of the upper and lower molding die parts 13 and gas pressure is applied within the tube of material (M) in a conventional way. As a result, the melted resinous material (M) is pressed against the molding surfaces 13a to form the ribs and recesses on the periphery of the corrugated tube. The upper and lower die trains 13b and 13c are circulated in the direction in which the synthetic resinous material (M) is extruded to mold the material and are cooled during transport. In this manner, the corrugated tube is taken out from the blow molding apparatus 12 as a finished product, with the sequential opening of the upper and lower molding die parts 13. The expanding slot lie is formed axially on the product by a cutter 15 which is applied thereto when it emerges from the upper and lower molding die parts 13.

Figure 6:
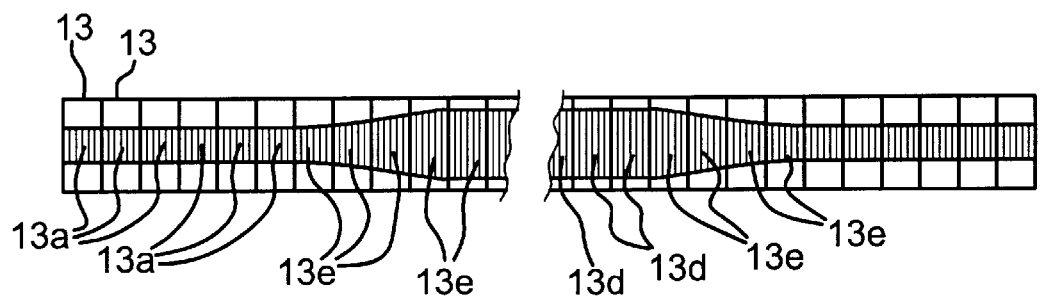
FIG. 6 is a plan view showing a train of molding dies used in the process of FIG. 5A.
Figure 7:
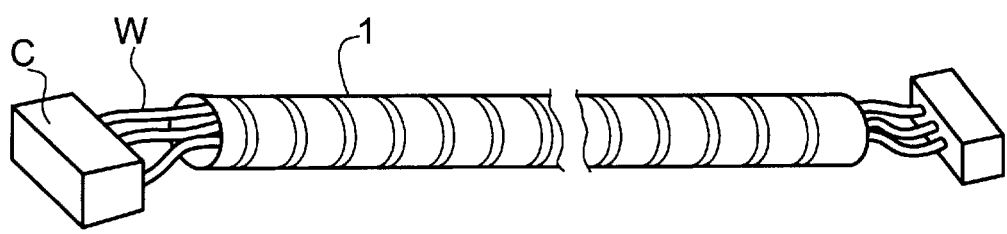
FIG. 7 is a perspective view showing a wire harness on which a conventional corrugated tube is installed.

An apparatus for forming the corrugated tube depicted in FIG. 7 by blow-molding is in general known. As shown in FIG. 6, in order to successively blow-mold the synthetic resinous material (M) into the corrugated tube 11 shown in FIG. 1, the shapes of the die parts 13 are varied along the is die train. The part of the synthetic resinous material (M) to be molded into the flat region 11c has a length corresponding to the length of the sum of sixty molding die parts 13 arranged horizontally. Sixty adjacent molding die parts 13 have a molding surface 13d whose shape corresponds to a part of the shape of the flat region 11c. About twenty molding die parts 13 having a molding surface 13e corresponding to parts of the shape of the transition regions lid are positioned at both ends of the sixty molding die parts 13 corresponding to the flat region 11c. The upper and lower die trains 13b and 13c are circulated to perform the blow-molding.

Figure 3D:
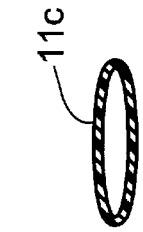
FIGS. 3B, 3C and 3D are sectional views on the lines X—X, Y—Y and Z—Z respectively of FIG. 3A, showing only the corrugated tube shown in FIG. 3A.
Figure 3C:
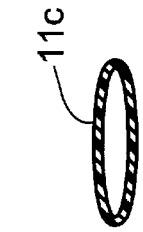
Figure 3B:

FIG. 3B is a sectional view of the cylindrical region 11b of the corrugated tube 11 formed by the blow-molding. FIG. 3C is a sectional view of the transition region lid of the corrugated tube 11. FIG. 3D is a sectional view of the flat region 11c of the corrugated tube 11.

As apparent from the above description, the flat region of the corrugated tube positioned in the lengthwise central region thereof can be installed flat on the floor of the interior of a vehicle minimizing a space between the corrugated tube and the floor, thus allowing the space required for installing the wire harness in the interior of the vehicle to be small. Consequently the space in the interior of the vehicle to be used effectively.

Although the present invention has been fully described in connection with the preferred embodiments thereof with reference to the accompanying drawings, it is to be noted that various changes and modifications may be made, such as those apparent to those skilled in the art, within the scope of the inventive concept. Such changes and modifications are to be understood as included within the scope of the present invention.

Although a tube having end parts of cylindrical cross-section and a central part of flattened cross-section is illustrated, the tube of the invention may have two or more such flattened regions, separated by a region of other cross-section, according to requirements.

What is claimed is:

1. A corrugated tube for use as a wire harness cover, having circumferentially extending corrugations along its entire length and along its length at least two first regions having a circular cross-section and between said first regions a second region having a first axis greater than the outer diameter of said cross-sections of said first regions and a second axis smaller than the diameter of said cross-sections of said first regions, wherein the second axis is transverse to said first axis, and a longitudinally extending expansion slit extends along the corrugated tube.

2. A corrugated tube according to claim 1, having transitional regions of varying cross-sectional shape connecting said second region to said first regions.

3. A corrugated tube according to claim 1, wherein the second region has a cross-sectional shape that is elliptical or race-track in shape.

4. A corrugated tube according to claim 1, made of synthetic resin.

5. A corrugated tube according to claim 4, wherein said first regions and said second region are in one-piece.

6. A wire harness having a bundle or wires and a tube surrounding said bundle of wires, said tube being a corrugated tube having circumferentially extending corrugations along its entire length and along its length at least two first regions having a circular cross-section and between said first regions a second region having a first axis greater than the outer diameter of said cross-sections of said first regions and a second axis smaller than the outer diameter of said cross-sections of said first regions, wherein said second axis is transverse to said first axis.

7. A wire harness according to claim 6, wherein said tube has, at its two opposite ends, respective regions of circular cross-sections.

8. A wire harness to be installed in a vehicle having a bundle of wires and a tube surrounding said bundle of wires, said tube being a corrugated tube having circumferentially extending corrugations along its entire length and along its length at least two first regions having a circular cross-section and between said first regions a second region having a first axis greater than the outer diameter of said cross-sections of said first regions and a second axis smaller than the outer diameter of said cross-sections of said first regions, wherein said second axis is transverse to said first axis.

9. A vehicle according to claim 8, wherein said second region of said tube lies on a floor panel of the vehicle.

10. A method of making a corrugated tube for use as a wire harness cover, having circumferentially extending corrugations along its entire length and along its length at least two first regions having a circular cross-section and between said first regions a second region having a first axis greater than the diameter of said cross-sections of said first regions and a second axis smaller than the outer diameter of said first region, the method including blow molding an extruded thermoplastic resin into a molding space formed by continuously advancing die segments, the die segments including first segments having a circular molding cross-section and second segments having a molding cross-section having a first axis greater than the diameter of the molding cross-sections of said first segments and a second axis smaller than the outer diameter of the molding cross-sections of first segment, wherein said second axis is transverse to said first axis.

11. A method according to claim 10, wherein each die segment includes opposed mold parts which when brought into contact with each other form a die segment and when spaced apart from each other release the molded tube.

* * * * *